G. H. MARSHALL.
SODA CALCINER.
APPLICATION FILED JAN. 9, 1911.
1,014,314.
Patented Jan. 9, 1912.
2 SHEETS—SHEET 1.
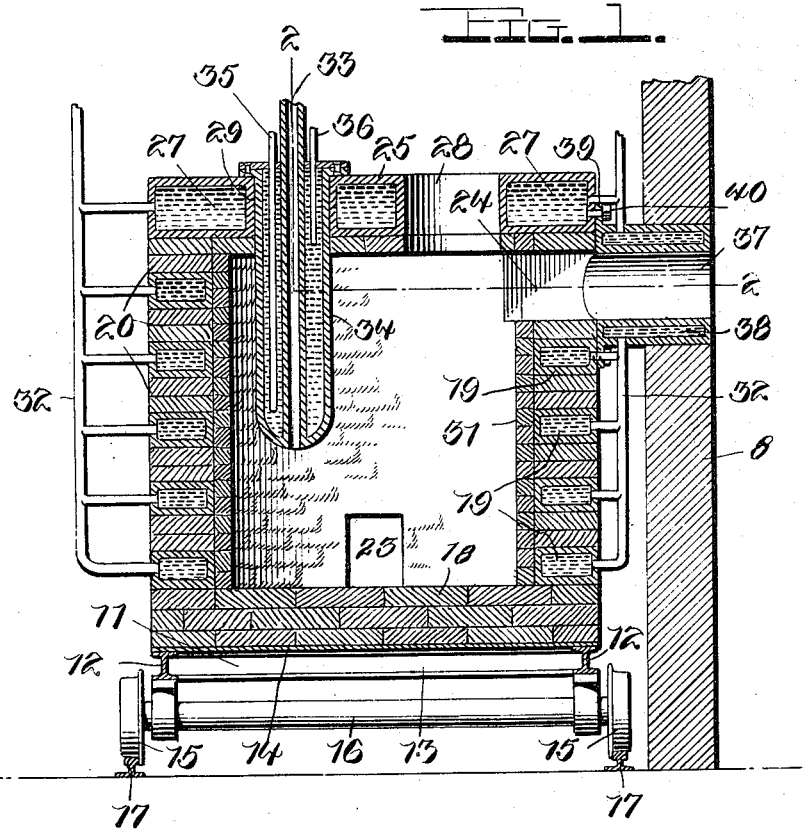
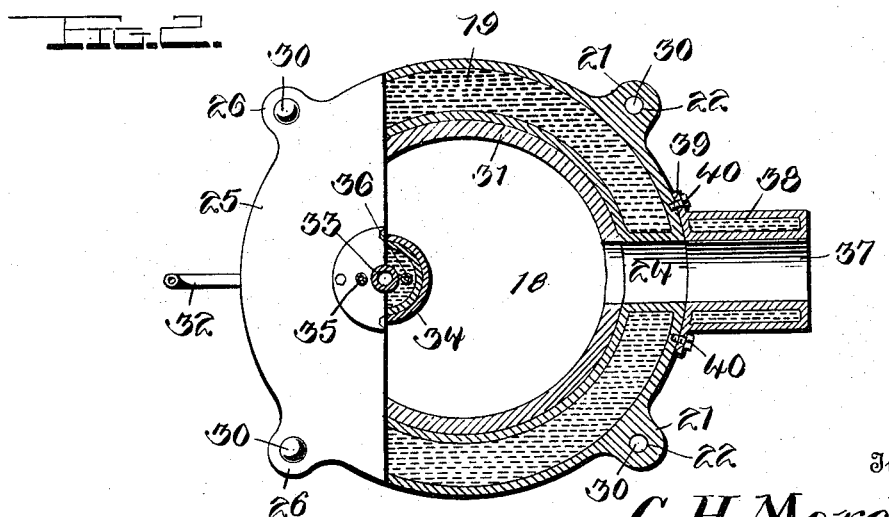
Witnesses
Chas. L. Griesbauer.
M. F. Reeder
Inventor
G. H. Marshall.
By Watson E. Coleman.
Attorney

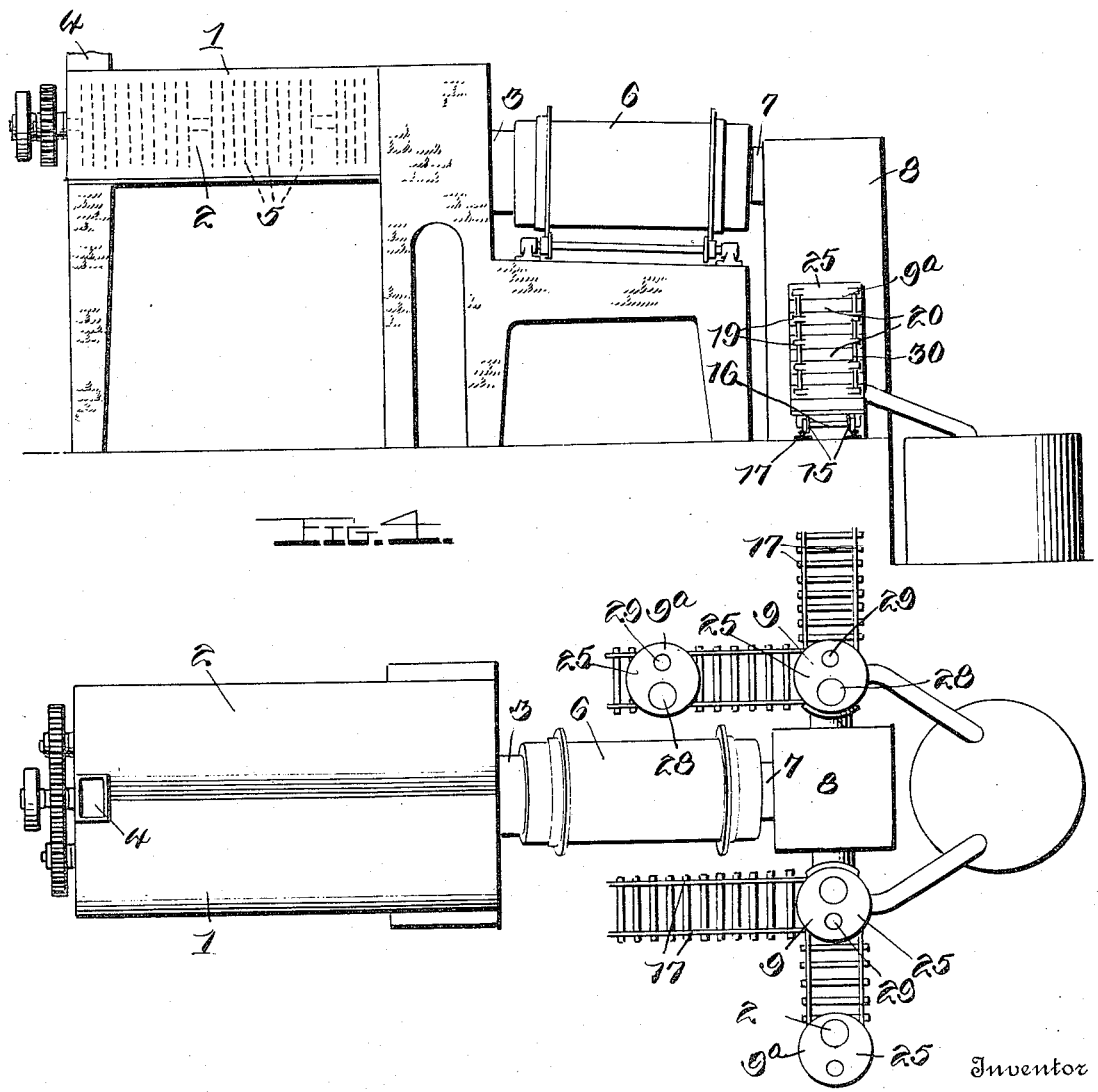

UNITED STATES PATENT OFFICE.

GEORGE H. MARSHALL, OF NEW YORK, N. Y.

SODA-CALCINER.

1,014,314.     Specification of Letters Patent.     Patented Jan. 9, 1912.

Application filed January 9, 1911. Serial No. 601,673.

*To all whom it may concern:*

Be it known that I, GEORGE H. MARSHALL, a citizen of the United States, residing at New York, in the county of New York and State of New York, have invented certain new and useful Improvements in Soda-Calciners, of which the following is a specification, reference being had to the accompanying drawings.

This invention relates to improvements in furnaces, especially such as are used in recovering soda from the black or waste liquor produced in the manufacture of wood pulp by the "soda" or "sulfate processes" in connection with an evaporator, a rotary furnace, and a fire box, in a plant for carrying on the work of recovering the soda, one object of the invention being to effect improvements in the construction of a furnace of this character whereby the same is rendered movable, and is adapted to be expeditiously replaced by another in the event it becomes worn or injured, so as to allow the other devices and apparatus in the plant to continue in operation, a further object of the invention being to effect improvements in the construction of the furnace whereby worn and injured parts thereof may be economically and expeditiously replaced and renewed.

In the accompanying drawings—Figure 1 is a vertical transverse sectional view of a furnace constructed in accordance with my invention. Fig. 2 is partly a plan and partly a horizontal sectional view of the same on the plane indicated by the line 2—2 of Fig. 1. Fig. 3 is a diagrammatic elevation of a soda recovering plant in which my improved furnace is employed. Fig. 4 is a diagrammatic plan of the same.

Referring especially to Figs. 3 and 4 of the drawings, the evaporator for concentrating the black or waste liquor and for recovering the soda ash from the gases which pass therethrough from the furnaces, is indicated at 1, and comprises essentially a tank 2, provided at opposite ends with intake and outlet flues 3, 4 and in which tank are a series of rotating baffles 5, which are partly submerged in the liquor in the tank for concentration, and the upper portions of which are in the space above the water line or liquor line, in the evaporating tank, and exposed to the action of the hot gases which carry soda ash dust and pass longitudinally through the evaporator. The particular construction of this evaporator forms the subject matter of another application for Letters Patent of the United States, executed by me simultaneously with the present case, Serial No. 601,674.

The usual rotary furnace is indicated at 6, the discharge thereof communicating with the intake flue 3 of the evaporator. The discharging end of the rotary furnace is in communication with the discharge flue 7 of a fire box 8.

On opposite sides of the fire box I here show furnaces 9, 9ª, embodying my present improvements. These furnaces 9, 9ª, may be used interchangeably and any one of them may have its discharge flue connected by an intake flue, to the fire box. When any one of the furnaces gets out of order, it is disconnected from the fire box, and another connected to the fire box immediately and used in its place so that the operation of the other devices or apparatus of the plant is not interrupted by injury to or the wearing out of any one of the furnaces.

Referring to Figs. 1 and 2 I will now describe the construction of one of my furnaces, it being understood that they are identical in construction. The base 11 of the furnace is a truck platform comprising angle side beams 12, and cross beams 13, which are secured together, the floor 14 being preferably composed of plate metal, such as iron or steel. The flanged wheels 15 of the axle 16 are mounted on track rails 17, so that the furnace may be moved on the track from one point to another. The hearth or bottom 18 of the furnace is composed of fire brick laid on the floor of the truck platform, and is circular in shape. The cylindrical wall of the furnace is composed of alternately disposed water rings 19, and brick or masonry rings 20. The water rings are hollow and are made of steel or iron, and each of the said rings is provided at suitable points with radial bosses 21 which have vertically alining openings 22. Certain of the water rings and masonry rings at the lower side and near the top of the furnace are provided each in one side with an opening, the said openings of the said rings forming a discharge opening 23 at the bottom of the furnace, and a flue opening 24 near the top thereof. The top 25 of the furnace is also made of iron or steel, is circular in form provided with bosses 26, and is hollow, and provided with a water compartment 27. Said cap is further provided with a feed opening 28 and with a blast opening 29. The water rings, masonry rings, and cap, having been assembled, as shown in Fig. 1, they are then securely fastened together, by means of bolt rods 30, which extend through the openings in the bosses of the said water rings and cap. The lining 31 of the furnace is constructed of fire brick. Water circulating pipes 32 are connected to the water rings and to the cap, and when the furnace is in use maintain a circulation of water through the compartments formed in and by the said water rings and cap. Hence the water rings and cap are prevented from becoming unduly heated, and the masonry rings are also measurably protected from overheating so that the life of the furnace is greatly prolonged.

The air blast pipe 33 extends downwardly through a water jacket 34 and is supplied with a water feed pipe 35 and a water outlet pipe 36, the said pipes serving to maintain a circulation of water through the said water jacket and around the discharge end of the air blast pipe. The flue 37 is provided with a water jacket 38, and has at its inner end a circular flange 39 which may be secured by bolts 40, to certain of the water rings and also to the water cap so as to dispose the flue in registration with the flue opening 24. This water jacketed flue is connected to one side of the fire box 8.

The tracks 17 are so laid and arranged that when one of the furnaces on either side of the fire box gets out of order and requires repair it may be disconnected from the fire box, moved out of the way, and another run up to the fire box and connected thereto in a very short space of time, so that the entire plant may be kept continuously in operation, and not be put out of commission in the event of injury to one of the portable furnaces.

In the operation of my invention the black liquor after concentration in the evaporator flows therefrom into the rotary furnace and issues from the rotary furnace, after combustion therein, as a thick heavy black ash, which is discharged from the rotary furnace and piles up on the floor formed by the top of the fire box, between the portable furnaces. This black ash is very high in carbon which if burned off affords heat for additional evaporation. Some fire is maintained in the fire box by ordinary fuel, and to keep up the continuous working of the plant as a whole, but generally very little fuel is required, the liquors being very rich in combustible material. The black ash is fed into the portable furnace or furnaces through the feed openings 28. These furnaces are connected to the fire box and a fire is maintained in the fire box, hence the black ash is ignited and is subjected to the action of the air blasts, so that the black ash is caused to burn very freely and fiercely, the gases and products of combustion passing from the portable furnaces through the flues 37, into the fire box, from the latter, into and through the rotary furnace, and from the rotary furnace into and through the evaporator, so that the heat and gases from the concentrated and converted black ash are used in the operation of the evaporator and rotary furnace as will be understood. The action in the portable furnaces is the conversion of sodium sulfate to sodium sulfid, and carbonate, and the fluxing and corrosive action of these molten chemicals is very severe on the furnace linings. My improved construction of furnaces enables the same to withstand such corrosive action and also enables repairs to be readily and cheaply effected, since when any of the rings, whether water rings or masonry rings, or both, become injured and worn, the parts of the furnace may be readily disassembled and new parts substituted for the worn parts. Moreover, by providing a plurality of furnaces for use successively in connection with the fire box, when any one of the furnaces needs repairs, another may be expeditiously substituted for it, and the operation of the plant continued uninterruptedly.

I claim:—

1. A furnace of the class described having its wall composed of separable, superposed, alternately disposed water rings and rings of refractory material.

2. A furnace of the class described having its wall composed of separable, superposed, alternately disposed water rings and masonry rings.

3. A furnace having a wall formed of a series of superposed, separable, alternately disposed refractory rings and water rings, and a cap, said water rings and cap having bosses projecting from the outer sides thereof and bolt rods connecting the said bosses of the water rings and the cap.

4. A furnace of the class described comprising a wall formed of a series of separable superposed water rings and masonry rings and a cap, said water rings and cap having bosses projecting from their outer sides, bolt rods connecting the bosses of said water rings and cap and a fire box and lining.

5. A furnace of the class described having its wall composed of superposed, alternately disposed water rings and rings of refractory material, said water rings and refractory rings corresponding in interior and exterior diameter so that each extends entirely through the wall.

In testimony whereof I hereunto affix my signature in the presence of two witnesses.

GEORGE H. MARSHALL.

Witnesses:
J. T. CHASE,
THOS. R. H. MURPHY.